UNITED STATES PATENT OFFICE.

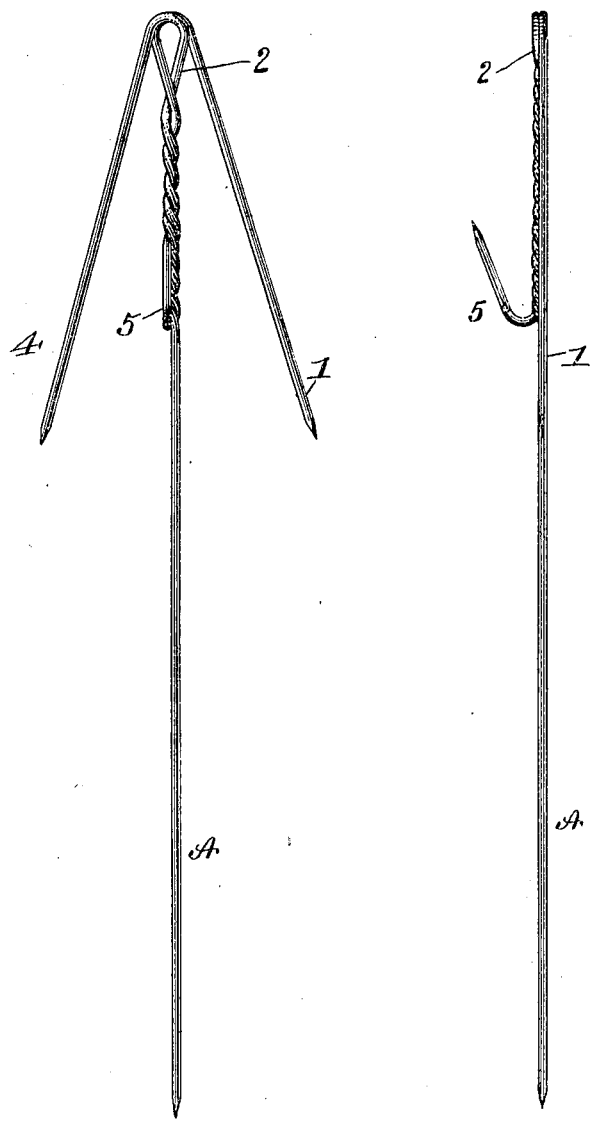

JACOB R. SJOLANDER, OF IRONWOOD, MICHIGAN.

FISH-HOOK.

954,352.  Specification of Letters Patent.  Patented Apr. 5, 1910.

Application filed December 27, 1909. Serial No. 535,016.

*To all whom it may concern:*

Be it known that I, JACOB R. SJOLANDER, a citizen of the United States, residing at Ironwood, in the county of Gogebic and State of Michigan, have invented certain new and useful Improvements in Fish-Hooks, of which the following is a specification.

My invention relates to an improvement in fish hooks more particularly adapted for catching large fish, such as maskalonge, pickerel, pike, and the like, and the object of the invention is to provide a hook which can be used for trolling, and the hook is so baited that as the fish grabbing for the bait grasps the rear end of the hook, the hook will become inverted so that the prongs of the hook will enter the body of the fish, thereby forming a means for holding the fish which will prevent the fish from shaking the hook out or spitting it out.

The invention consists of certain novel features of construction and combinations of parts which will be hereinafter more fully described and pointed out in the claims.

In the accompanying drawings—Figure 1 is a view in front elevation, and Fig. 2 is a view in side elevation.

A represents the shank of the hook, which forms the central member and is sharpened to a point at one end. The shank is bent at or near the upper end, and the bent portion extends diagonally from the main portion of the shank forming a prong 1, which lies approximately in the same plane with the main portion of the shank. The shank and prong members are made of wire, and another wire is connected to the shank member at its upper end by twisting the two wires together, and one end of the wire 2 is bent diagonally therefrom and lies in the plane with the prong 1, forming a second prong 4. A prong 5 is formed at the rear end of the wire 2 between the prongs 1 and 4 which extend in opposite directions to each other, and the space between the wire 2 and the shank A forms an eyelet through which the line passes and is connected to the hook. The ends of the hook, prongs, and shank are all sharpened to a point.

These hooks can be made of any size for catching different fish, and the hook is baited preferably in the following manner: The long, sharp point or shank A is inserted into the mouth of the bait so that about one-half an inch of the point or end projects through the belly of the fish. The distended points or prongs are fitted one into each gill of the fish bait, and the prong 5 projects through the upper body of the bait. The hook thus baited is drawn slowly through the water as in ordinary trolling. The fish sought attacks the bait either from the side or from the rear end if the line is slack enough to permit and as soon as a "strike" occurs the fisherman lets the whole thing go, that is, he lets out the slack line, so that the fish may swallow the bait head first, when the line becomes inverted, running out past the long point or shank A. This causes the two prongs 1 and 4 and the prong 5 to enter the body of the fish, as he has swallowed the whole thing, and he is thereby unable to shake out the hook or rid himself of it in any manner.

It is evident that more or less slight changes might be made in the form and arrangement of the several parts described without departing from the spirit and scope of my invention, and hence I do not wish to be limited to the exact construction herein set forth, but:

Having fully described my invention, what I claim as new and desire to secure by Letters Patent is:—

1. As an article of manufacture, a fish hook comprising a central shank sharpened at one end and having prongs permanently connected with the opposite end of the shank and diverging therefrom in the direction of the sharpened end of the shank, and provided with an eyelet at the juncture of said prongs.

2. As an article of manufacture, a fish hook comprising a central shank sharpened at one end and having prongs permanently connected with the opposite end of the shank and diverging therefrom in the direction of the sharpened end of the shank, and provided with an eyelet at the juncture of said prongs, and a third prong on the shank projecting in a direction opposite to that of the other prongs.

3. As an article of manufacture, a fish hook comprising a central shank sharpened at one end and having prongs permanently connected with the opposite end of the shank and diverging therefrom in the direction of the sharpened end of the shank, and provided with an eyelet at the juncture of said prongs, and a third prong on the shank projecting in a direction opposite to that of the other prongs, said prongs formed by twisting two wires together at one end of the shank, and bending their ends thus formed outwardly from the shank, whereby to form the prongs.

In testimony whereof I affix my signature, in the presence of two witnesses.

JACOB R. SJOLANDER.

Witnesses:
BELMONT WAPLES,
IZETTA LEKSELL.